Patented Apr. 27, 1943

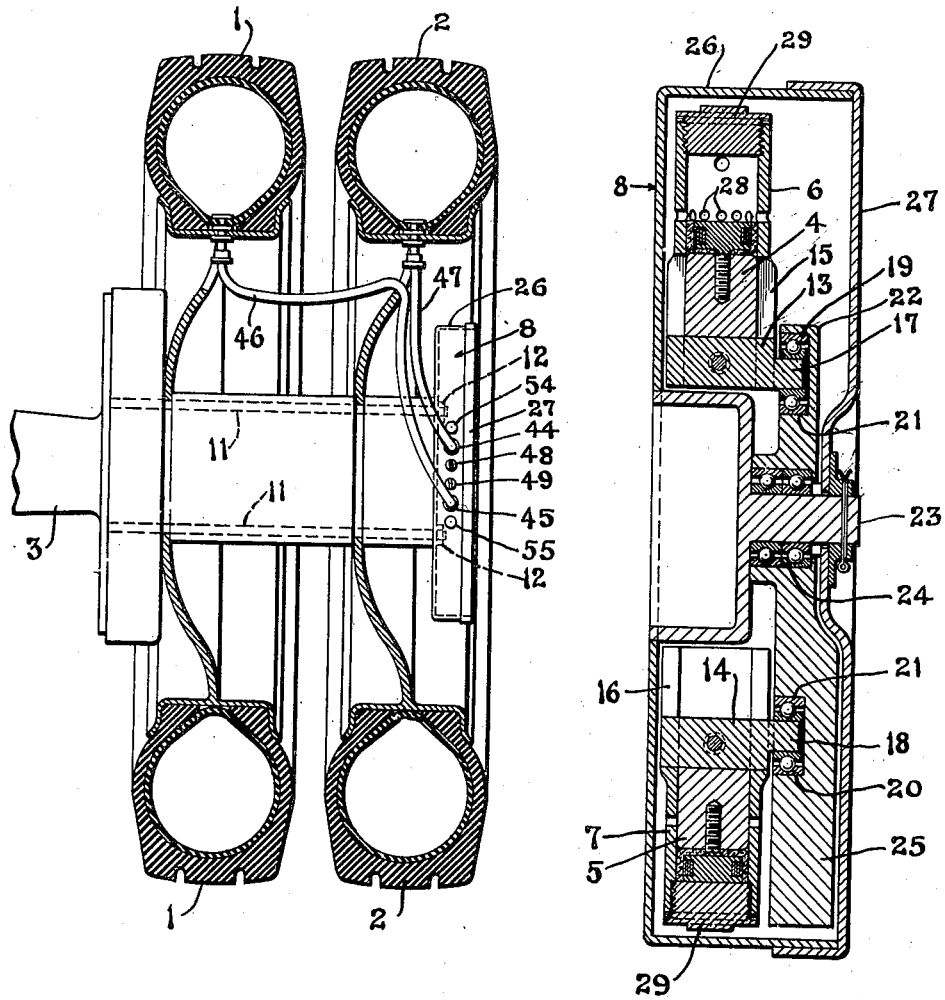

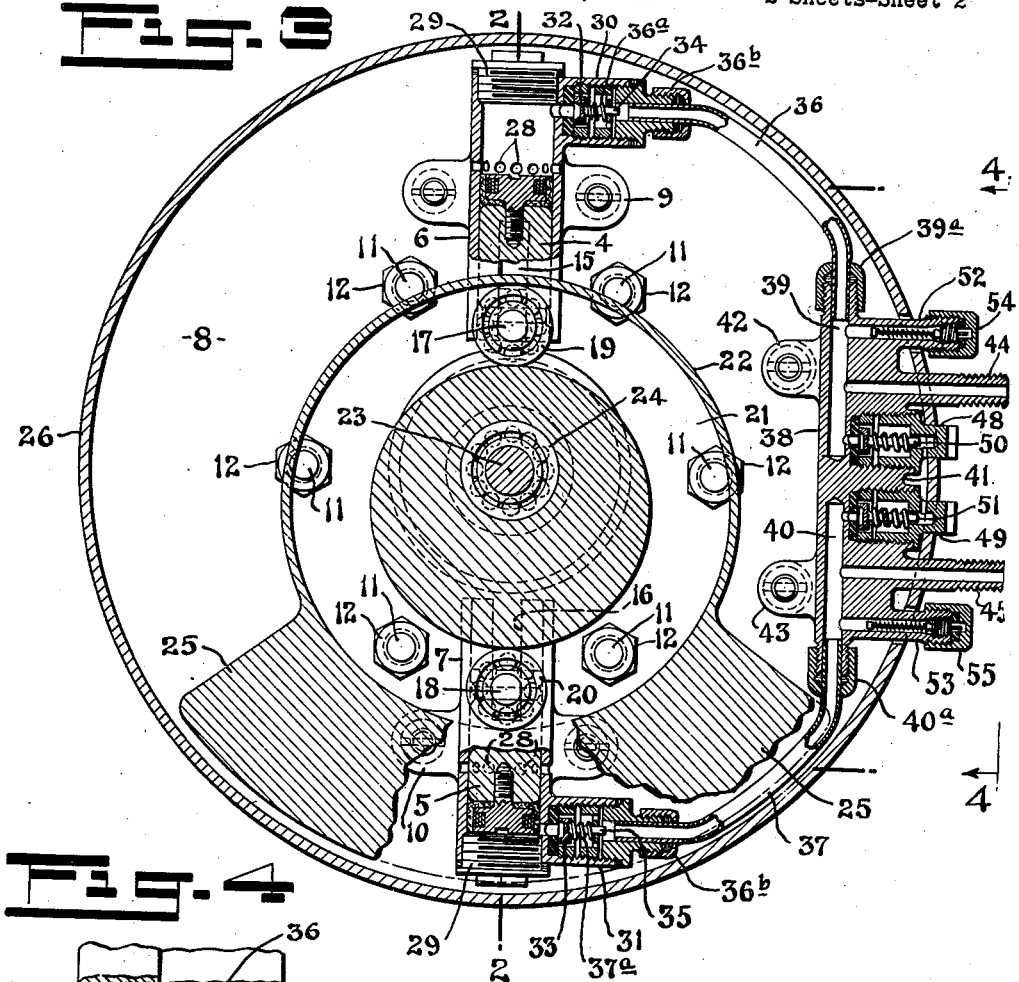

2,317,636

UNITED STATES PATENT OFFICE 2,317,636

DUAL TIRE INFLATER

Clark W. Parker, Dobbs Ferry, N. Y.

Application February 24, 1941, Serial No. 380,209

7 Claims. (Cl. 152—422)

The invention relates to an automatic tire inflater device by which dual pneumatic tires used on trucks, buses, and other like automotive vehicles, may be inflated simultaneously or separately and to a predetermined pressure and maintained at such pressure while the vehicle is being operated along the road.

The invention has for its primary object the provision of a novel pumping mechanism by which dual tires for automotive vehicles may be inflated while the vehicle is being operated, and which will maintain a predetermined amount of air pressure in both of the dual tires under ordinary operating conditions of the vehicle.

A further object of the invention is to provide a device for inflating dual pneumatic tires used on automotive vehicles and which will prevent either one of said tires from collapsing due to a slow leakage or over-inflation.

A further object of the invention is to provide a device for inflating dual tires of an automotive vehicle which may be mounted on the hub of the wheel upon which the dual tires are mounted, and which is operated by the rotation of the wheel.

Other objects of the invention will be set forth in the following description and drawings, and will be pointed out in the appended claims.

In order that my invention may be clearly understood, I have provided drawings, wherein Figure 1 represents a view of two tires in section, mounted on a wheel of a vehicle and showing accompanying supporting parts including features of my invention;

Figure 2 is a sectional view of Figure 3, taken on the line 2—2 of said figure;

Figure 3 is a view in sectional elevation looking at the face of the rim of the casing of the device and showing the arrangement of the parts with parts broken away; and Figure 4 is a view taken on the line 4—4 of Figure 3, looking in the direction of the arrows.

Similar parts are designated by the same reference characters in the several views.

Referring to the drawings, and particularly to Figure 1, the numerals 1 and 2 indicate the dual tires which may be inflated by my pumping mechanism. The wheels or the rims are shown as mounted on a live axle indicated at 3.

The tires are inflated from a common pumping mechanism which is generally illustrated in Figure 3 and also shown in Figure 2, and which is adapted to be housed in a casing, indicated at 8. The pumping mechanism is provided with two pistons shown at 4 and 5 and which operate in the housings 6 and 7. The housings 6 and 7 are adapted to be secured to the casing 8 by any suitable means, such as by the supporting members 9 and 10.

The casing 8 is adapted to be secured to the hub of the wheel upon which the dual tires are mounted by means of bolts 11 and nuts 12.

The pistons 4 and 5 slide freely within the housings 6 and 7 guided by the cross-heads 13 and 14 which operate in slots 15 and 16. Projecting from one side of the cross-heads 13 and 14 are crank pins 17 and 18 which enter ball-bearing structures 19 and 20 which are adapted to travel in an eccentric groove 21 formed in a disc 22.

The disc 22 is journaled eccentrically on pin 23, the ball bearing 24 being mounted on said pin so as to provide smooth and approximately frictionless bearing for running within the hub of the cam. The disc has a massive weight 25 carried thereby. The construction as above described enables the disc and weight to hang pendent on the pin 23, enabling the two to have only a slight vibration on said pin.

The weight 25 carried by the disc 23 hangs loosely within the chamber formed by the casing 8, and extends almost to the bottom of the rim 26 of said casing.

The casing 8 is made sufficiently deep to house all of the devices and mechanism associated with the pumping mechanism, except the armored portions of the valve conduits and other outlets, which will presently be described. The casing 8 is adapted to be closed by a cover plate 27.

The piston housings 6 and 7 are provided with air holes, indicated at 28, for the purpose of permitting air to be drawn into the casings during the reciprocation of the pistons therein. It will be noted in connection with the air holes 28 that during the operation of the pistons in their casings one of the pistons, for example, piston 4, will be moving forward forcing the air coming in the holes 28 to the tires while the other piston 5 will be accomplishing its backward stroke and will create a vacuum in its housing. This will have a tendency to prevent the weight 25 from being turned over or being displaced from its ordinary hanging position in the casing. The end portions of the piston housings are also provided with the screw-threaded closure caps 29. These caps are for the purpose of quick assembly of the parts of the piston or repair of these parts.

The piston housings 6 and 7 have formed at their ends the extension chambers 30 and 31 which communicate with conduits 36 and 37. Mounted in the chambers 30 and 31 are check valves. These valves include the valve heads 32 and 33 which are mounted on the centralizing stems 34 and 35, and around which are the coiled springs 36a and 37a. One end of the coiled springs engages the valve heads, and the other rests on collars formed in the valve chambers. The valve heads 32 and 33 are normally held against their seats by the springs and become unseated only when air is pumped through the piston housings by the pistons 4 and 5, the springs 36a and 37a being just sufficiently strong to hold the valve heads 32 and 33 normally against their seats, but not strong enough to prevent said valve heads from becoming unseated when they are subjected to the pressure of the air being pumped by the pistons. In actual practice, an air pressure of approximately three ounces is sufficient to unseat the valve heads 32 and 33.

The conduits 36 and 37 may be secured to the chambers 30 and 31 in any suitable manner, so that they are in communication with the piston casings. As shown in the drawings they are secured to said chambers by means of the screw-threaded couplings 36b. The conduits 36 and 37 extend to and communicate with the chambers 39 and 40 formed in a valve body 38, and may be secured to said fixture by means of the screw-threaded couplings 39a and 40a.

The valve body 38 is formed with the chambers 39 and 40, already referred to, and which are separated from each other by the partition 41. The valve body is adapted to be secured to the casing 8 by members 42 and 43.

The valve body is further formed with the outlets 44 and 45 which respectively communicate with the chambers 39 and 40, and which extend through the rim of the casing 8 and are connected to the tubular pipes 46 and 47 leading to the tire valves of the dual tires (see Figure 1).

The valve body 38 is also formed with the outlets 48 and 49 which respectively communicate with the chambers 39 and 40, and in which are provided relief valves. These relief valves may be of any well known construction and consist of a spring-controlled valve head under regulation of the adjustable screw nut indicated at 50 and 51.

The relief valves mounted in outlets 48 and 49 are adapted to relieve the tires of air in case of over-inflation, and may be adjusted so as to function as relief valves in accordance with a predetermined air pressure existing in the tires. Usually these valves may be set to function when the air pressure in the tires exceeds thirty pounds.

The valve body is also provided with outlets 52 and 53 which also communicate with chambers 39 and 40, and in which are mounted the standard type of valve construction which is adapted to relieve tires of air and also to test the pressure of air in the tires, and to which the usual gauge device may be applied for testing the air pressure. The usual caps 54 and 55 may be secured to the ends of these outlets.

The tubular pipes 46 and 47 which are connected to the outlets 44 and 45 are also connected at their other ends to the tire valves of the dual tires 1 and 2, as shown in Figure 1.

It will be seen from the above description that my improved pumping mechanism will operate to inflate the dual tires on a vehicle in the following manner.

When the casing 8 in which the pumping mechanism is mounted is secured to the hub of the wheel of the vehicle and the pipes 46 and 47 are connected to the tire valves of the dual tires and to the outlets 44 and 45 of the valve body of the pumping mechanism, the rotation of the vehicle wheel will cause the pistons 4 and 5 in the piston housings 6 and 7 to be alternately reciprocated due to the travel of the rollers 19 and 20 in the eccentric groove 21 in disc 22, which is held in fixed, or approximately fixed position by the weight 25. The alternate reciprocation of the pistons 4 and 5 will result in air being drawn into the housings through the air ports 28 and the forcing of said air through the valve chambers 30 and 31 and through tubes 36 and 37 to the chambers 39 and 40 in the valve body 38. The air thus forced into chambers 39 and 40 will also be caused to pass through the outlets 44 and 45 and thence through the pipes 46 and 47 to the dual tires. When the air pressure in said tires has been built up to a required amount, which may be determined by a regulation of the relief valves in outlets 48 and 49, any further air pumped to the chambers 39 and 40 of the valve body 38 will cause the relief valves to become unseated and the excess air will thus escape through said relief valves. The regulation of the action of the relief valves may readily be accomplished on the outside of the casing 8 by merely turning the screw-headed caps 50 and 51 to adjust the tension of the springs bearing against the valve heads of said valves.

If it should happen that one of the tires should develop a slow leak, the continued action of the pumping mechanism while the vehicle is moving along the road will cause air to be pumped to the leaking tire and thus keep it sufficiently inflated until repairs can be effected.

By reason of the fact that the casing 8 containing the pumping mechanism can be readily attached to the hub of the wheel of the automotive vehicle, it can be seen that the inflater device is readily adaptable for use on most all of the types of vehicles which employ dual tires mounted on a single axle of an automobile wheel. Furthermore, because the pumping mechanism is carried in the casing 8 with its cover 27 entirely enclosing the same, said pumping mechanism is completely protected from dirt and grease which may be thrown up from the road by the wheel and may be operated for long periods of time without having to be inspected or cleaned. It is also apparent that by reason of the construction and arrangement of the several parts and devices of my pumping mechanism, the said parts and devices are readily accessible for repair or adjustment without having to remove the same from the hub of the wheel.

Having now described my invention, what I claim is:

1. In combination with an automobile wheel having dual tires thereon, a tire inflater mechanism mounted on the hub of said wheel and so as to rotate therewith, said mechanism including a pair of individual pumping means each having a reciprocating plunger for supplying air under pressure to each of said dual tires, a free swinging weighted means pivotally mounted with respect to said pumping means for alternately reciprocating the plungers of said pumping means when said wheel is rotated, and means for controlling the amount of air supplied to each of said tires by said pumping means.

2. In combination with an automobile wheel having dual tires thereon, a tire inflater mechanism mounted on the hub of said wheel and so as to rotate therewith, said mechanism including a pair of individual pumping means each having a reciprocating plunger for supplying air under pressure to each of said dual tires, a weight pivotally associated with said pumping means, an eccentric cam slot formed in said weight, and means operating in said cam slot for alternately actuating the plungers of said pumping means.

3. In combination with an automobile wheel having dual tires thereon, a tire inflater mechanism mounted on the hub of said wheel and so as to rotate therewith, said mechanism including a pair of individual pumping means for pumping air to each of said dual tires, a weight pivotally associated with said pumping means, an eccentric cam slot formed in said weight, means operating in said cam slot for actuating said pumping means, and a valve body having valve devices mounted therein for controlling the amount of air supplied to each of said tires by said pumping mechanism.

4. In combination with an automobile wheel having dual tires thereon, a common pumping mechanism for inflating said dual tires mounted in a casing removably positioned as a unit on the hub of said wheel and so as to rotate therewith, said mechanism consisting of a pair of pumps each including a piston housing and a piston operating therein for pumping air under pressure to each of said dual tires, a free swinging reaction weight mounted adjacent said pumps and having an eccentric channel formed in a part thereof, and means associated with said pistons and operating in said eccentric channel for alternately actuating said pistons in their housings.

5. In combination with an automobile wheel having dual tires thereon, a tire inflater mechanism for said dual tires mounted on the hub of said wheel and so as to rotate therewith, said mechanism including a valve body for controlling the amount of air supplied to each of said tires, a pair of pumps for supplying air under pressure to said valve body and through the same to said dual tires, check valves intermediate the pumps and said valve body to prevent the escape of air from said valve body and said tires through said pumps, escape valves associated with the valve body to prevent the over-inflation of either of said dual tires, a reaction weight mounted adjacent said pumps and having an eccentric channel formed in a part thereof, and means associated with said pumps and operating in said eccentric channel for actuating said pumps when the wheel of the vehicle rotates.

6. In combination with an automobile wheel having dual tires thereon, a tire inflater mechanism for said dual tires mounted on the hub of said wheel and so as to rotate therewith, said mechanism including a valve body for controlling the amount of air supplied to each of the tires, a pair of pumps for supplying air under pressure to said valve body and to said tires, check valves intermediate the pumps and said valve body to prevent the escape of air from said valve body through said pumps, escape valves associated with the valve body to prevent over-inflation of said tires, and means actuated by the rotation of the wheel for effecting the operation of said pumps comprising a free swinging eccentrically grooved weighted means pivotally mounted with respect to said pumping means for alternately operating said pumps.

7. In combination with an automobile wheel having dual tires thereon, a tire inflater mechanism mounted on the hub of said wheel and so as to rotate therewith, said mechanism including a valve assembly for controlling the amount of air supplied to each of the tires, a pair of pumps for supplying air under pressure to said valve assembly and to said tires, and a free swinging weighted means actuated by the rotation of the wheel on the road and pivotally mounted with respect to said pumps for alternately effecting the operation of the pumps, and means to relieve either of the tires of air in case of over inflation in accordance with a predetermined air pressure existing in said tire.

CLARK W. PARKER.